United States Patent [19]

Terashita et al.

[11] 4,364,650
[45] Dec. 21, 1982

[54] EXPOSURE CONTROL METHOD AND DEVICE

[75] Inventors: Takaaki Terashita; Kazuo Shiota; Kenji Nakauchi, all of Minami-ashigara, Japan

[73] Assignee: Fuji Photo Film Co., Ltd., Kanagawa, Japan

[21] Appl. No.: 193,888

[22] Filed: Oct. 3, 1980

[30] Foreign Application Priority Data

Oct. 5, 1979 [JP] Japan .................................. 54-128626

[51] Int. Cl.³ .............................................. G03B 7/08
[52] U.S. Cl. .................................. 354/31; 354/60 R; 250/214 P
[58] Field of Search ...................... 354/31, 60 R, 23 D; 250/214 P, 209; 356/221, 222; 355/38, 68

[56] References Cited

U.S. PATENT DOCUMENTS 3,790,275 2/1974 Huboi et al. ................. 250/214 P X
4,075,640 2/1978 Ueda et al. ............................. 354/31

Primary Examiner—William B. Perkey
Attorney, Agent, or Firm—Pasquale A. Razzano

[57] ABSTRACT

A number of light measuring elements are arranged at various portions of an image of an object focused by an objective. The light measuring elements are grouped for different zones to measure the average brightness of the image within the respective zones. The average brightness of the image is weighed and added together to calculate the brightness of the object based on which the exposure is controlled.

3 Claims, 28 Drawing Figures

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

EXPOSURE CONTROL METHOD AND DEVICE

BACKGROUND OF THE INVENTION

1. Field of the Invention

The present invention relates to an exposure control method and a device therefor for use in a photographic camera, a motion picture camera, a television camera or the like, and more particularly to a method of controlling exposure for such an optical instrument in which the exposure is controlled based on the brightness of a focused image of the object to be photographed and an exposure control device for carrying out the method.

2. Description of the Prior Art

There have been known an average light measuring system in which one or two light measuring elements are used for measuring the brightness of the image of an object as a whole and a central spot light measuring system in which the central portion of the image is particularly measured. Further, recently it has been known to use a number of light measuring elements to measure the various portions of the image and detect the maximum and minimum brightness of the image to control exposure based on the maximum or minimum brightness or average brightness calculated therefrom.

The above-mentioned conventional methods of exposure control suffer from defects in that the obtained exposure becomes under or over depending upon the specific brightness distribution of the image as of back-light image or scene having a dark background.

SUMMARY OF THE INVENTION

The object of the present invention is, therefore, to provide a method of controlling exposure in which proper exposure can be obtained even when the image has uneven distribution of brightness.

Another object of the present invention is to provide a device for controlling exposure carrying out the above method of exposure control.

Still another object of the present invention is to provide a method of controlling exposure in which proper exposure can be obtained for various kinds of images by changing the light measuring mode depending upon the object.

A further object of the present invention is to provide a method for controlling exposure in which proper exposure can be obtained for various positions of the camera or the like by changing the light measuring mode depending upon the position of the camera.

A still further object of the present invention is to provide an exposure controlling device for carrying out the above methods in which proper exposure can be obtained for various kinds of objects and for various positions of the camera or the like.

The above objects of the invention are accomplished by dividing the light measuring range of an image of an object into a number of zones, arranging at least one light measuring elements in the respective zones, obtaining the average brightness of the image in the respective zones (Bmi), calculating the object brightness B based on the average brightnesses Bmi by the formula:

$$B = K_1 + \sum_{i=1}^{n} K_{(i+1)} \cdot Bmi \quad (1)$$

($K_1$, $K_{i+1}$ are coefficients.), and controlling the exposure based on the object brightness B.

The average brightness Bmi is obtained by dividing the sum of the log-converted value of the measured brightness by the number of light measuring elements in the zone, or by obtaining the average of the brightness measured by the light measuring elements in the respective zones and log-converting the sum. Therefore, there is no fear that the brightness is effected by the high brightness portion of the object as experienced in the conventional central spot light measuring system.

The present invention is advantageous in that the most desirable complex zone pattern can easily be selected for the given object and further the average brightness of the respective zones can be properly weighted by use of proper weighting coefficients, and accordingly the exposure control can be conducted more properly than any conventional method.

The present invention is further advantageous in that the zone pattern can be changed for different scene of the object. For instance, in case of a spot light illuminated object, the image area is divided into concentric zones distributed around the center of the image, and in case of an object in back light the area is divided into zones distributed concentrically around a point a little below the center of the image area.

Further, it is possible to change the weighting coefficients for the respective zones for different scenes of the object. For instance, in case of a spot light illuminated object, the central zones are provided with larger weighting coefficients, and in case of a back light object the marginal zones are provided with smaller coefficients.

Furthermore, it is possible to obtain a whole average brightness (Bo) averaged throughout the whole image and use the same for correcting the exposure by adding the same to the above brightness (Bmi) after weighting the former.

In case that the zone pattern is asymmetrical and the position thereof changes as the position of the camera changes, the position of the camera is detected to correct the position of the zone pattern so that the zone pattern may properly be applied to the object image even when the camera position is changed.

DESCRIPTION OF THE PREFERRED EMBODIMENTS

Now the present invention will be described in detail with reference to the accompanying drawings.

Figure 1:
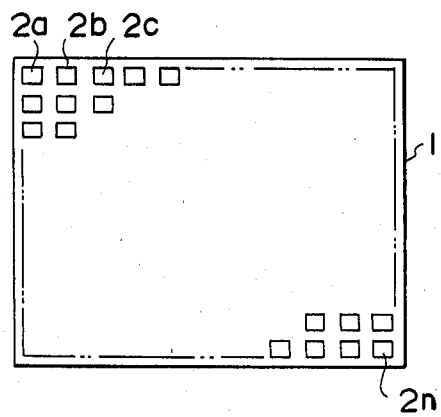
FIG. 1 is a plan view of the light measuring portion used in the present invention.

Referring to FIG. 1 showing the light measuring portion employed in the present invention, a number of light measuring elements $2a$ to $2n$ are provided on a base board 1 in the form of a matrix. The light measuring elements $2a$ to $2n$ may be in the form of photodiodes, photovoltaic elements, phototransistors, CdS, photo-charge storing type CCD (charge coupled device) and the like. Since the CCD has a narrow dynamic range, it is desirable that the storing time be changed according to the brightness of the object to control sensitivity.

Figure 2:
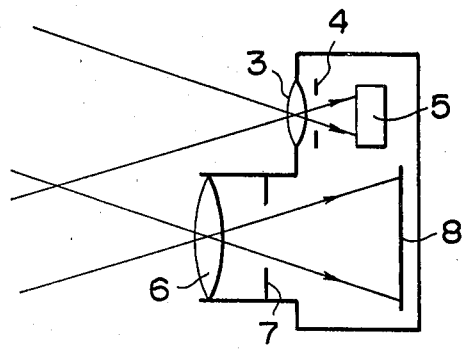
FIGS. 2 to 5 are side sectional views showing the various arrangements of the light measuring portion used in the present invention.

FIGS. 2 to 5 show various examples of the light measuring portion. FIG. 2 shows an example in which the light measurement is conducted in parallel to the photographing system. In this example, an objective 3 is located in front of a light measuring portion 5 with the intervention of a stop 4 located therebetween. A taking lens 6 is provided separately therefrom in parallel thereto to focus an image on a photographic film 8 through a stop 7. Thus, the light measuring portion 5 measures the light from the object (not shown) to be photographed by the camera with the taking lens 6.

Figure 3:
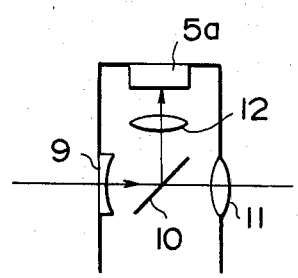

FIG. 3 shows another example in which a light measuring portion $5a$ is provided in a view finder. An objective 9 is provided in front of an eyepiece 11 with the intervention of a semi-transparent mirror 10 located therebetween. The semi-transparent mirror 10 reflectes a part of the light coming in through the objective 9 toward the light measuring portion $5a$.

Figure 4:
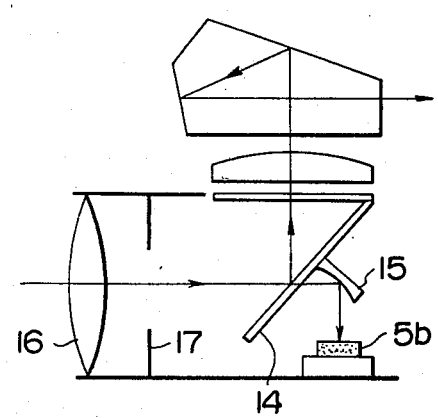

FIG. 4 shows another example in which a light measuring portion $5b$ is provided in a single lens reflex camera. A part of the swing-up mirror 14 is made transparent to transmit the light coming in from the taking lens 16. A concave mirror 15 is located behind the mirror 14 to reflect the light transmitting through the mirror 14 downward toward the light measuring portion $5b$. A stop 17 is located behind the taking lens 16. Thus, a part of the light coming in through the taking lens 16 is focused on the light measuring portion $5b$ and forms a small image of the object to be photographed thereon.

Figure 5:
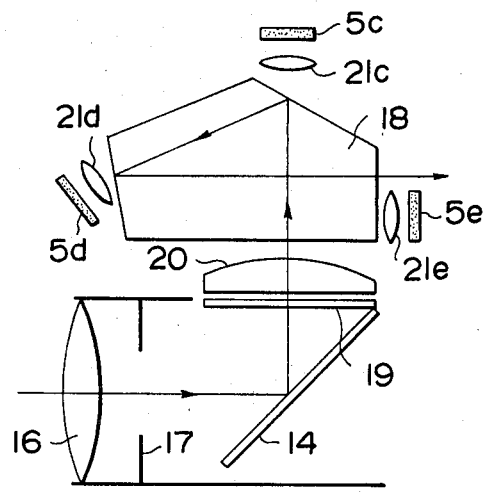

FIG. 5 shows still another example in which light measuring portions $5c$, $5d$ and $5e$ are located in the vicinity of a pentagonal prism 18 of a single lens reflex camera as shown in FIG. 4. The mirror 14 reflects the light coming in from the taking lens 16 upward. The light reflected upward by the mirror 14 enters a pentagonal prism 18 through a focusing glass 19 and a condenser lens 20. The light measuring portion $5c$ is located above the prism 18, $5d$ in front thereof and $5e$ therebehind. In front of the respective light measuring portions $5c$, $5d$ and $5e$ are located focusing lenses $21c$, $21d$ and $21e$, respectively.

Figure 6:
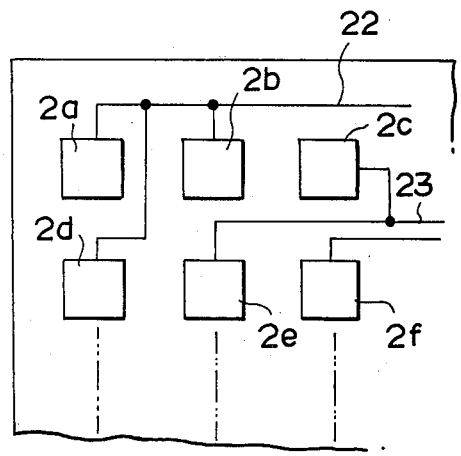
FIG. 6 is a partial explanatory view showing an example of an arrangement of the light measuring elements connected with lead lines.
Figure 7A:
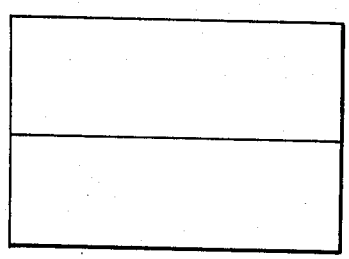
FIGS. 7A to 7H are front views showing various examples of the zone pattern.
Figure 7B:
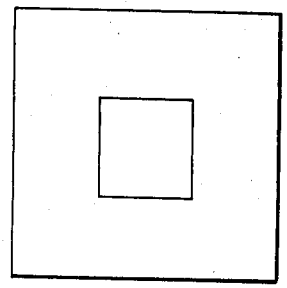
Figure 7C:
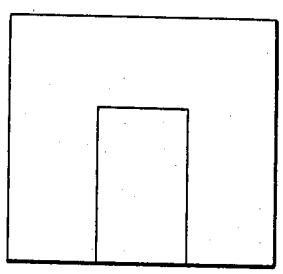

The light measuring portion 5 as mentioned hereinabove is provided with a number of light measuring elements $2a$, $2b$, ... $2f$ connected by means of lead wires 22 and 23 according to the group of the elements divided in zones. In the example shown in FIG. 6, elements $2a$, $2b$ and $2d$ are connected together and elements $2c$, $2e$ and $2f$ are connected together. The former three make one zone and are grouped together and the latter three make another zone and are grouped together. By dividing the light measuring elements $2a$, $2b$, ... light photodiodes into two groups, it is possible to divide the image area into two zones as illustrated in FIGS. 7A to 7C. Further, by dividing the area into more zones, the area can be divided as shown in FIGS. 7D to 7H, for example. In the example as shown in FIG. 7H, the image area or the light measuring portion is divided into three zones, i.e. one being illustrated as blank zone, another as hatched zone and the other as cross-hatched zone each zone consisting of a plurality of elements.

Since the brightness of the marginal portion of the image is low due to the optical performance of the objective or the taking lens, the output of the light measuring elements located in the marginal region of the focused image is low. Therefore, it is desirable that the light receiving area of the light measuring elements located in the marginal portion or the area of the zone in the marginal portion be made larger than that of the central portion.

Figure 7D:
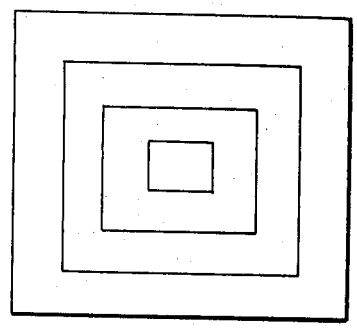
Figure 7E:
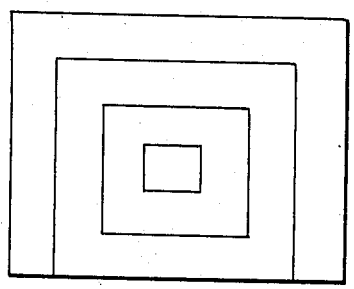
Figure 7F:
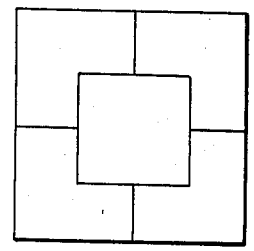
Figure 7G:
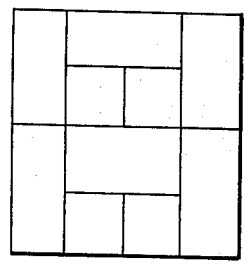
Figure 7H:
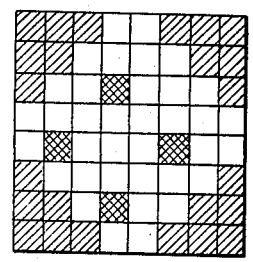

The zone pattern as shown in FIG. 7B or 7D is symmetric both vertical and horizontally. Therefore, the pattern does not change with the position of the camera. The zone pattern as shown in FIG. 7D is used with the weighting coefficients as follows for example, where the coefficients Ki correspond to those shown in formula (1):

$K_1 = 1.43$, $K_2 = 0.53$ (coefficient of zone $Z_1$),
$K_3 = 0.12$ (of zone $Z_2$), $K_4 = -0.08$ (of zone $Z_3$),
$K_5 = 0.34$ (of zone $Z_4$).

The exposure control method and device in accordance with the present invention employs the light measuring portion 5, $5a$, $5b$ ... as shown above in FIGS. 7A to 7H located at the position as shown in FIGS. 2 to 5, for example. Now the exposure control circuit connected with the light measuring portion employed in the present invention will be described in detail with reference to FIG. 8.

Figure 8:
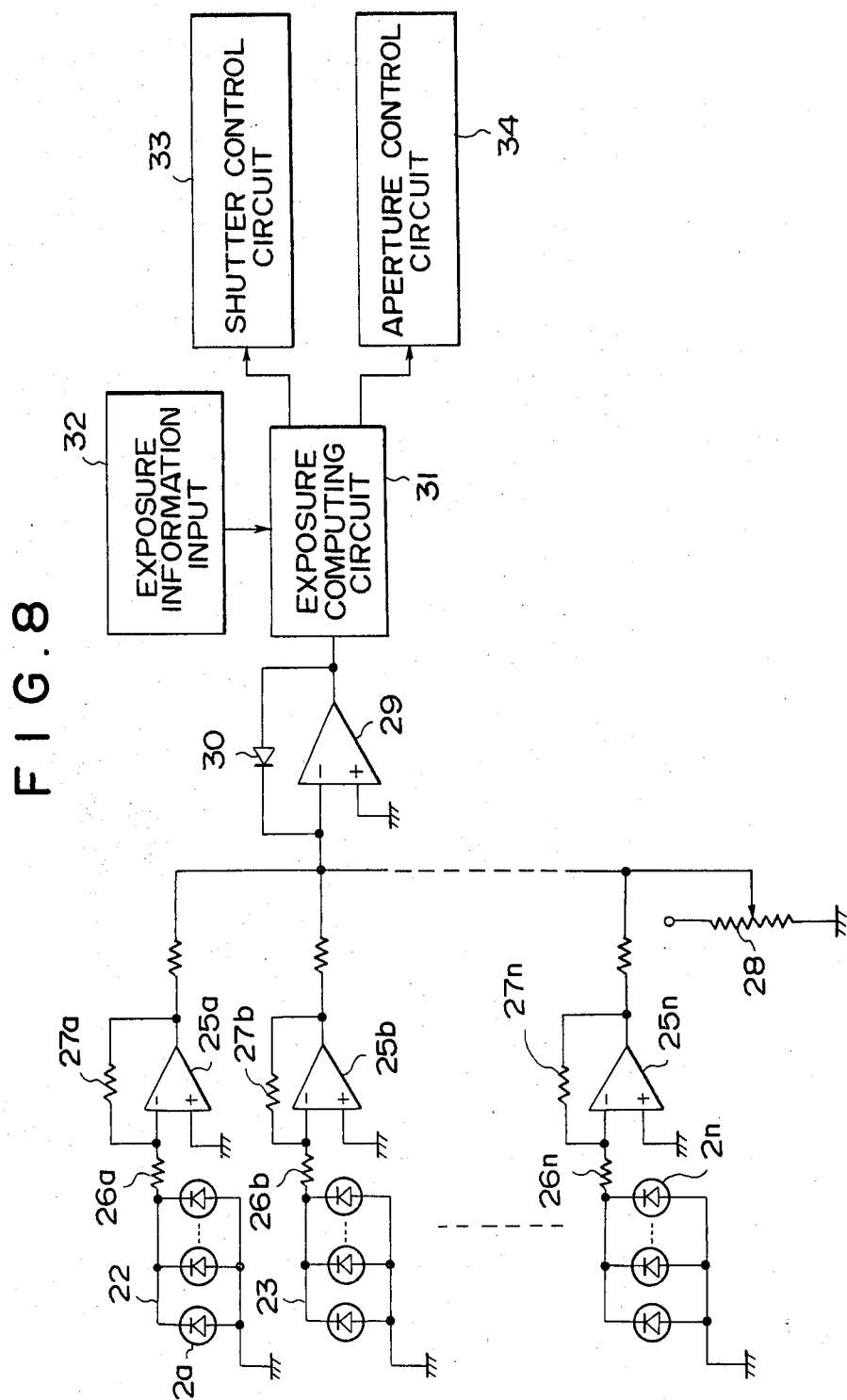
FIG. 8 is a circuit view showing an embodiment of the exposure control device in accordance with the present invention.

FIG. 8 shows an example of the exposure control circuit employed in the present invention. The photodiodes $2a$, $2b$, ... $2n$ as shown in FIG. 6 grouped for the zones are connected respectively to operational amplifiers $25a$, $25b$, ... $25n$. The operational amplifiers $25a$, ... $25n$ are provided with resistors $26a$ ... $26n$ and feedback resistors $27a$ ... $27n$ for controlling the gain thereof. The gain is controlled to provide a weighting coefficient for the averaged value of the outputs of the light measuring elements in the zone.

The weighted output signals of the zones weighted by the operational amplifiers $25a$ ... $25n$ and the output signal from a potentiometer 28 for providing the constant value $K_1$ of the formula (1) are inputed into an operational amplifier 29 and log-converted by a log-diode 30 and summed up. In this embodiment the averaged values are all summed up. However, it is possible to subtract one output signal of a light measuring zone 5 from the sum of the output signals of the other light measuring zones. For example, when the image includes a bright sky, it is possible to subtract the output of the zone corresponding to the sky from the sum of the outputs of the other zones.

The output of the operational amplifier 29 is sent to an exposure computing circuit 31 as the object brightness information, where a photographic calculation is conducted together with a film sensitivity and the like from an exposure information input means 32. The output of the exposure computing circuit 31 controls the shutter control circuit 33 or the aperture control circuit 34 connected thereto. In the above embodiment as shown in FIG. 8, the photodiodes 2a in the same group are connected in parallel directly with lead wires. However, the photodiodes may be connected after amplified by amplifiers.

Figure 9:
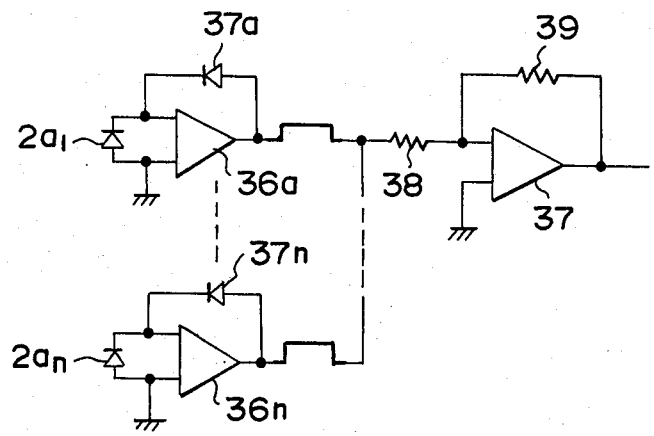
FIG. 9 is a circuit view showing an example of a variation of the circuit in which the output of photodiodes is amplified before connected to the control circuit.

FIG. 9 shows one of such examples in which the photodiodes $2a_1 \ldots 2a_n$ are respectively connected with operational amplifiers $36a \ldots 36n$ and the output of the photodiodes are amplified thereby. At the same time, the photodiodes $2a_1 \ldots 2a_n$ are connected with log-diodes $37a \ldots 37n$ which are connected in parallel with the operational amplifiers $36a \ldots 36n$. Thus, the output of the photodiodes $2a_1 \ldots 2a_n$ is subjected to log-conversion and impedance conversion. The output signals of the operational amplifiers $36a \ldots 36n$ are inputed into an operational amplifier 37 and summed up here. The resistors 38 and 39 connected before and in parallel to the operational amplifier 37 are used for weighting the averaged value of the output signals.

Figure 10:
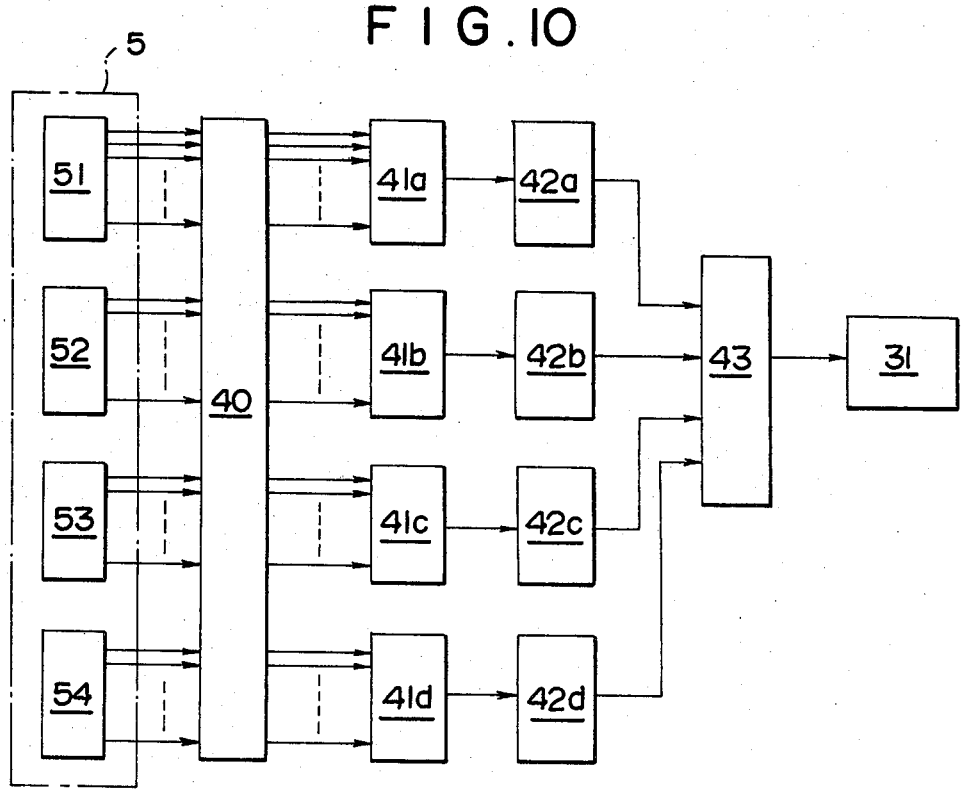
FIG. 10 is a block diagram showing another embodiment of the exposure control device in accordance with the present invention.

FIG. 10 shows another example of the exposure control device in accordance with the present invention in which the light measuring portion as shown in FIG. 7D is employed. The light measuring portion 5 is divided into four zones $5_1, 5_2, 5_3$ and $5_4$ which are connected with a log-conversion circuit 40.

The log-conversion circuit 40 is constituted of a set of operational amplifiers and log diodes connected in the feed-back circuit thereof for the respective light measuring elements $2a_1 \ldots 2a_n$ in the respective light measuring zones.

The log-converted signals are inputed into adding circuits $41a \ldots 41d$ provided for the respective zones $5_1 \ldots 5_4$ and summed up. As the adding circuits $41a \ldots 41d$, adders using operational amplifiers can be used.

The output signals of the adding circuits $41a \ldots 41d$ are inputed into dividing circuits $42a \ldots 42d$ and divided by a coefficient determined for the area of the zones. By this division, the average brightness Bmi for the respective zones is calculated.

The average brightness thus obtained is inputed into a weighting adding-and-subtracting circuit 43 and addition and subtraction are conducted after being weighted. Thus, the operation of the formula (1) is conducted by the circuit 43 to calculate the object brightness B. The brightness B thus obtained is inputed into the exposure calculating circuit 31.

Figures 11A, 11B, 11C, 13, 14A, 14B, 14C:
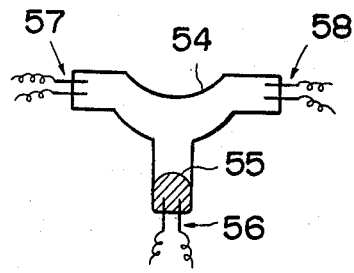
FIGS. 11A to 11C are front views showing the relationship between the position of the camera and the way of dividing the image area into zones.
FIG. 13 is a front view showing an example of a camera position detecting means.
FIGS. 14A to 14C are front views showing another example of the way of dividing the area into zones.

FIGS. 11A to 11C show embodiments in which the light measuring portion is divided into two zones. Since the zones are divided into asymmetric pattern with respect to the horizontal central line, the position of the zones change as the position of the camera changes.

FIG. 11A shows the zone pattern in which the camera is held horizontally, namely in its normal position. FIG. 11B shows the zone pattern in which the camera is held with its left side up. FIG. 11C shows the zone pattern in which the camera is held with its right side up. The light measuring elements are numbered 1 to 25. In the position of FIG. 11A, elements 12, 13, 14, 17, 18, 19, 22, 23 and 24 are grouped into one zone and the others are grouped into the other zone. In FIG. 11B, 8,9,10,13,14,15,18,19 and 20 are grouped into one zone and the remainder into the other, and in FIG. 11C, 6,7,8,11,12,13,16,17 and 18 are grouped into one zone and the remainder into the other.

Figure 12:
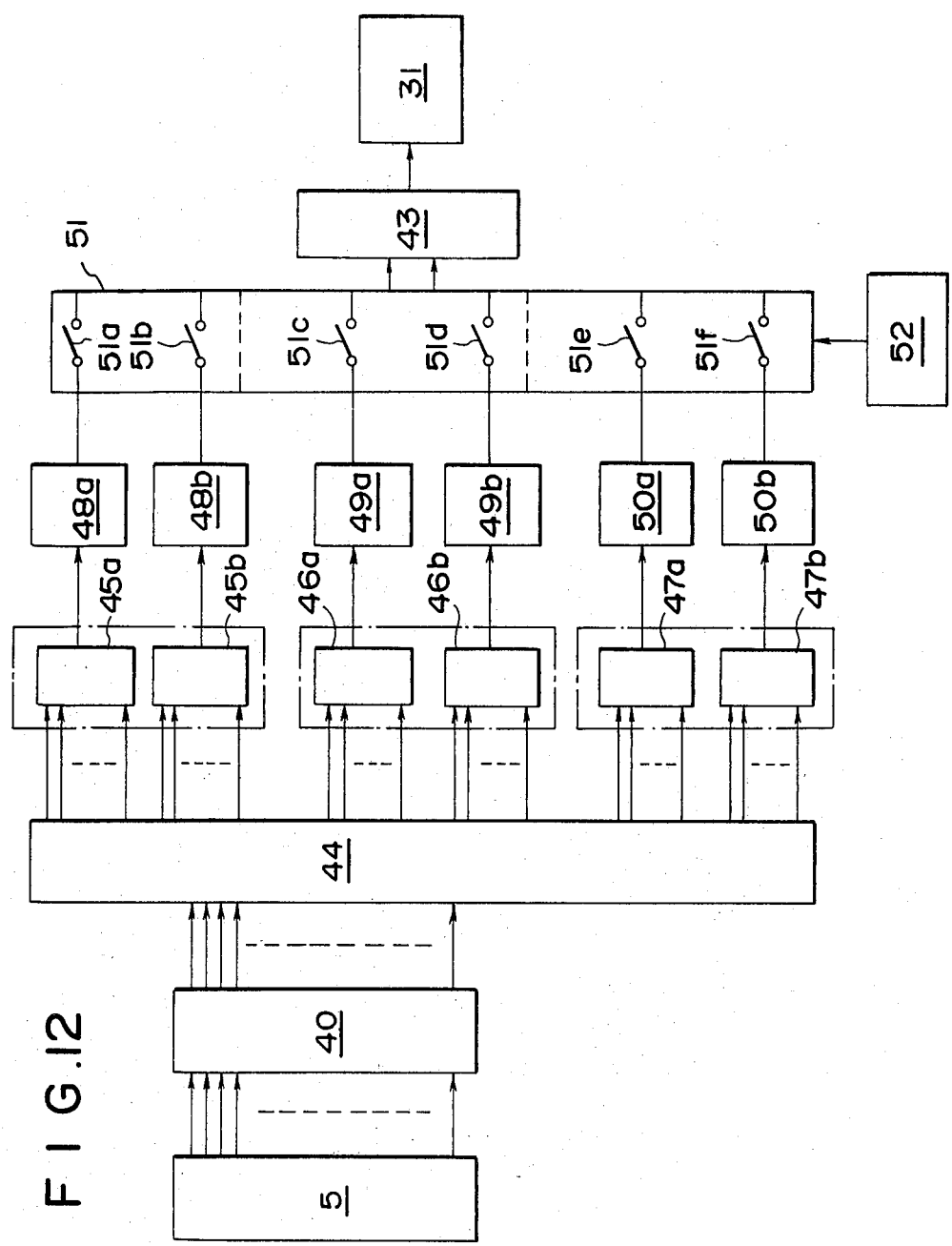
FIG. 12 is a block diagram showing an exposure control device which is able to change the way of dividing the area into zones according to the position of the camera.

FIG. 12 shows an embodiment of the exposure control device in accordance with the present invention in which the light measuring portion as shown in FIGS. 11A to 11C having two zones asymmetrically divided is used. The output of the light measuring portion 5 is first log-converted by a log-conversion circuit 40 and then inputed into a matrix circuit 44. The matrix circuit 44 makes three groups each consisting of two groups for the three different positions.

In more detail, in case of FIG. 11A in which the camera is held horizontally, the lower central nine elements grouped into one zone and the remainder are connected to two adding circuits 45a and 45b, respectively. In case of FIG. 11B in which the camera is held with left side up, the right central nine elements grouped into one zone and the remainder are connected to adding circuits 46a and 46b, respectively. Similarly, in case of FIG. 11C, the left central nine elements and the remainder are connected with adding circuits 47a and 47b, respectively.

The outputs of these adding circuits 45a,45b,46a,46b,-47a and 47b are inputed into dividing circuits 48a,48b,-49a,49b,50a and 50b, respectively. The dividing circuits divide the summed value by the number of the light measuring elements in each zone.

The average brightness is thus obtained for three kinds of zone pattern for three different positions of the camera. One of the three average brightness outputs is selected according to the position of the camera by means of an analog switch 51. The analog switch 51 is connected with a camera position detecting means 52 and one of three sets of switches 51a,51b, 51c,51d, and 51e,51f is turned on according to the detected position of the camera. When the camera is in the horizontal position, analog switches 51a and 51b are turned on to transmit the output of the dividing circuit 48a and 48b to a brightness calculating circuit 43. When the camera is held with the left side up, the analog switches 51c and 51d are turned on and when right side up the switches 51e and 51f are turned on. The circuit 43 is connected with an exposure computing circuit 31. FIG. 13 shows an example of the camera position detecting means. A Y-shaped glass tube 54 is filled with mercury 55. The mercury 55 moves within the glass tube 54 as the position of the camera changes. When the camera is held horizontally, the mercury 55 stays in the lower section of the Y-shaped glass tube 54 as shown in FIG. 13 and electrically closes the switch 56 which corresponds to the first set of analog switches 51a and 51b mentioned above for instance. When the camera is moved to the left side up position in FIG. 13, the mercury 55 moves to the position to close the switch 58.

The coefficients Ki for the formula (1) for the other examples of the zone pattern may be determined as follows for example.

For the example as shown in FIG. 7C in which the light receiving area is divided into a rectangular section at the lower center and a U-shaped outer section, the coefficients for the formula (1) may be determined as follows:

$K_1 = 1.80$, $K_2 = 0.69$ (central), $K_3 = 0.21$ (outer).

For the example as shown in FIGS. 14A to 14C in which the light receiving area of the light measuring portion is divided into a lower central small section, a middle O-shaped section and an outer U-shaped section, the coefficients may be determined as follows:

$K_1 = 1.64$, $K_2 = 0.22$ (central), $K_3 = 0.42$ (middle), $K_4 = 0.27$ (outer).

Figure 15:
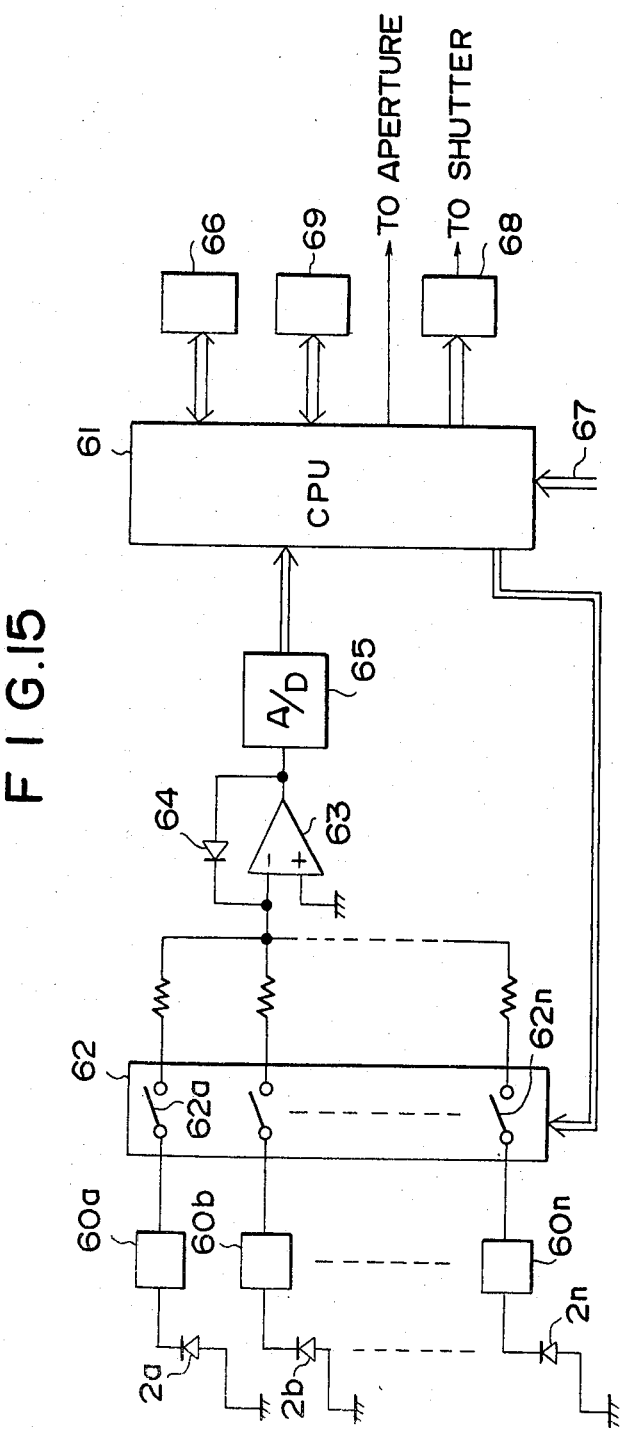
FIG. 15 is a block diagram showing an embodiment of the exposure control device of this invention in which the way of dividing the area into zones can be changed by means of a switching circuit.

FIG. 15 shows another embodiment in which the zone pattern can be freely changed by selecting connection of the photodiodes by use of a switch circuit. Photodiodes $2a \ldots 2n$ are connected with buffer circuits $60a \ldots 60n$ respectively, which in turn are connected with a switch circuit 62 in which selected switches $62a \ldots 62n$ included in the same zone designated by a code signal from a CPU 61 are turned on. By the switch circuit 62 the output signal of the photodiodes in the same zone are inputed into an operational amplifier 63 and summed up being log-converted by a log-diode 64.

The output signal of the operational amplifier 63 is recorded in a RAM 66 after converted to a digital signal by an A/D converter 65.

Then, turning on another set of switches $62a \ldots 62n$ selected by the designation by the CPU 61 to sum up the outputs of another group of photodiodes included in another zone, the output representing the brightness of the image covering this zone is obtained. This output is similarly A/D converted and recorded in the RAM 66. Thus, the data for all the zones are recorded in the RAM 66. After all the data are recorded in the RAM 66, the brightness information B is finally obtained by use of the formula (1).

From the camera side, exposure information representing the film sensitivity, aperture size or shutter speed and the position of the camera is given in the form of an exposure information signal 67 and inputed into the CPU 61 constituted of a microcomputer or the like.

A shutter control circuit 68 is connected with the CPU 61 and functions as both a timer and a buffer and outputs a shutter control signal based on a code signal from the CPU 61.

Further, a ROM 69 is connected with the CPU 61 in which are recorded the program for designating the zone and the program for calculating the finally desired exposure factor based on the exposure information given by the exposure information signal 67.

Further, in the embodiment as shown in FIG. 15, it is possible to change the combination of the photodiodes $2a \ldots 2n$ depending upon various conditions. For instance, when the brightness of the object is too low to conduct a proper light measurement due to insufficient sensitivity of the light measuring portion 5, the switch circuit 62 is controlled by the order of the ROM 69 to increase the number of photodiodes which constitute one zone. For example, when 64 photodiodes are used to make 64 picture cells, four photodiodes located adjacent to each other can be made to form one picture cell and accordingly 16 picture cells in all. The 16 picture cells are properly divided to make several zones. In case of such an object of low brightness, the reduction of the number of picture cells does not affect the light measurement since the contrast is not so high.

Further, in the above described digital circuit, the load of the CPU 61 is not so large since the data are inputed into the CPU 61 after the data are subjected to an analog calculation. Therefore, the capacity of the RAM 66 and the processing time can be saved.

Figure 16:
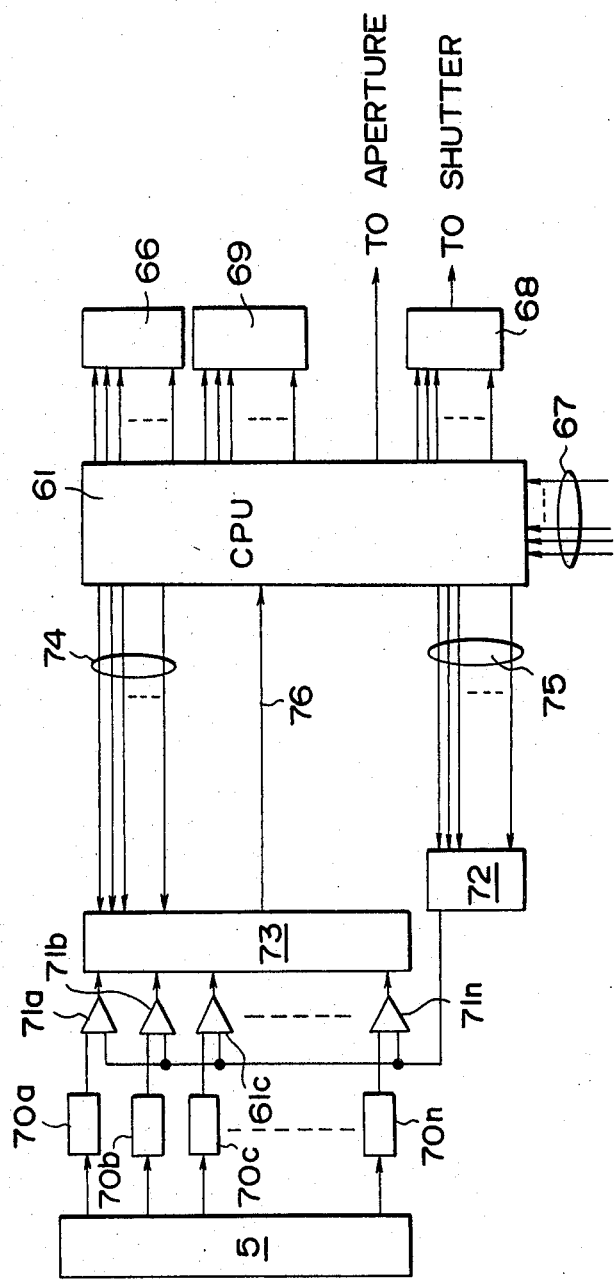
FIG. 16 is a block diagram showing an embodiment of a digital type exposure control device.

FIG. 16 shows another embodiment of the exposure control circuit. This embodiment is of digital type. The outputs of the light measuring portion 5 are inputed into log-conversion circuits $70a \ldots 70n$ respectively. The outputs of the log-conversion circuits $70a \ldots 70n$ are inputed into comparators $71a \ldots 71n$, respectively, which in turn compare the received outputs from the log-conversion circuits $70a \ldots 70n$ with a reference signal from a D/A conversion circuit 72. The outputs of the comparators $71a \ldots 71n$ are connected with a multiplexer 73. The multiplexer 73 selects one comparator among the number of comparators $71a \ldots 71n$ based on the multiplexer address signal 74 from the microcomputer CPU 61. After one of the comparator, e.g. $71a$, is selected by the multiplexer 73, a set value signal 75 indicating the set value to which the output from the log-conversion circuit $70a$ is counted up is sent to the D/A converter 72 and the comparator $71a$ starts to compare the output with the reference signal from the D/A conversion circuit 72. The reference signal from circuit 72 gradually increases and is compared with the output of the log-conversion circuit $70a$ by the comparator $71a$. When the level of the reference signal reaches the level of the output from circuit $70a$, an agreement signal is outputed by the comparator $71a$. Then, the multiplexer 73 outputs the agreement signal 76 which in turn is inputed into the CPU 61.

Since the address of the light measuring element in the light measuring portion 5 is known from the multiplexer address signal 74 and the digital value is known from the set value signal 75, when the agreement signal 76 is outputed the set value is recorded in the address in the RAM 66 corresponding said address of the light measuring elements.

Then, after the multiplexer address signal 74 is incremented the output signal of the log-conversion circuit $70b$ next to said circuit $70a$ is similarly recorded in the RAM 66.

Figure 17:
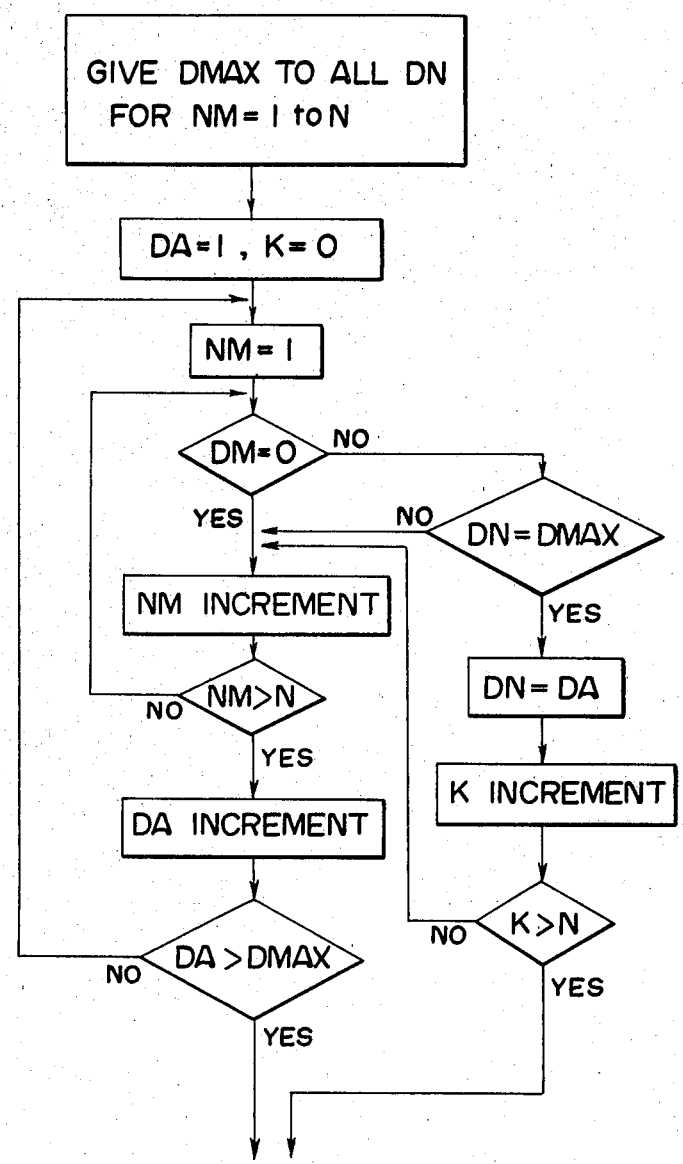
FIG. 17 is a flow chart which shows the process of data input employed in the present invention.

FIG. 17 shows the above process of recording the data in the RAM 66 after A/D conversion thereof, in which the reference characters mean the factors as follows:

DM: log-converted output of light measuring elements
DA: set value of D/A converter
NM: address of light measuring elements
N: number of light measuring elements
DMAX: maximum value set by D/A converter
DN: content of DA.

We claim:
1. A method of controlling exposure based on the brightness of an object measured by light measuring means comprising steps of
   arranging a number of light measuring elements in a light measuring area for measuring the brightness of the object the image of which is focused on said light measuring area, said light measuring elements outputing a signal representing the brightness measured thereby,
   dividing said light measuring area into n-number of zones of a desired pattern, each zone including at least one of said light measuring elements, obtaining an average brightness Bmi (i: address of the zone) of said zone by calculation based on the output signals of said light measuring elements, obtaining the object brightness B by calculation based on said average brightness Bmi by use of a formula of $$B = \sum_{i=1}^{n} K_{i+1} \cdot Bmi$$

where $K^1$ and $K_{i+1}$ are coefficients, controlling exposure based on the object of brightness B; and dividing said light measuring area into different patterns of zones for different positions of the optical instrument to which the method is applied.

2. A method of controlling exposure based on the brightness of an object measured by light measuring means comprising steps of arranging a number of light measuring elements in a light measuring area for measuring the brightness of the object the image of which is focused on said light measuring area, said light measuring elements outputting a signal representing the brightness measured thereby, dividing said light measuring area into n-number of zones of a desired pattern, each zone including at least one of said light measuring elements, obtaining an average brightness Bmi (i: address of the zone) of said zone by calculation based on the output signals of said light measuring elements, obtaining the object brightness B by calculation based on said average brightness Bmi by use of a formula of $$B = \sum_{i=1}^{n} K_{i+1} \cdot Bmi$$

where $K^1$ and $K_{i+1}$ are coefficients, controlling exposure based on the object of brightness B;

dividing said light measuring area into different patterns of zones for different positions of the optical instrument to which the method is applied; and dividing said light measuring area into different patterns of zones for different kinds of objects.

3. An exposure control device for controlling exposure based on the brightness of an object measured by light measuring means which measures the brightness of the object the image of which is focused on a light measuring area wherein the improvement comprises;

a number of light measuring elements arranged in said light measuring area, means for obtaining an average output of the outputs of said light measuring elements in each zone, means for weighting the averaged outputs and summing up the weighted outputs, means for controlling exposure based on the brightness of the object obtained by summing up the weighted outputs; and said light measuring elements being connected to one input terminal of an operational amplifier by way of analog gates, said analog gates being selectively turned on to input desired outputs of the light measuring elements into said operational amplifier.

* * * * *